United States Patent
No et al.

(10) Patent No.: US 8,966,440 B2
(45) Date of Patent: Feb. 24, 2015

(54) CUSTOM APPLICATION CREATION IN MULTI-TENANT SYSTEMS

(75) Inventors: Jamie No, Lynnwood, WA (US); Daniel Jacob Donovan, San Francisco, CA (US); Evan Michael Moses, San Francisco, CA (US); Mary Kathryn Scotton, Gladstone, NJ (US); Michelle Cheng Jowitt, Oakland, CA (US)

(73) Assignee: salesforce.com, inc., San Francisco, CA (US)

(*) Notice: Subject to any disclaimer, the term of this patent is extended or adjusted under 35 U.S.C. 154(b) by 216 days.

(21) Appl. No.: 13/445,785

(22) Filed: Apr. 12, 2012

(65) Prior Publication Data

US 2013/0055201 A1  Feb. 28, 2013

Related U.S. Application Data

(60) Provisional application No. 61/528,594, filed on Aug. 29, 2011.

(51) Int. Cl.
G06F 9/44 (2006.01)
G06F 3/00 (2006.01)
G06F 3/048 (2013.01)
G06F 17/30 (2006.01)

(52) U.S. Cl.
CPC .... *G06F 3/048* (2013.01); *G06F 9/44* (2013.01); *G06F 17/30* (2013.01); *G06F 17/30557* (2013.01); *G06F 8/30* (2013.01); *G06F 9/4446* (2013.01)
USPC ........... 717/113; 717/104; 717/111; 717/116; 715/760; 715/762; 715/788

(58) Field of Classification Search
None
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,754,858 A * | 5/1998 | Broman et al. | 717/111 |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |

(Continued)

OTHER PUBLICATIONS

Xiaolin Lu, "An Investigation on Service-Oriented Architecture for Constructing Distributed Web GIS Application", [Online], 2005, pp. 1-7, [Retrieved from Internet on Oct. 7, 2014], <http://ieeexplore.ieee.org/stamp/stamp.jsp?tp=&arnumber=1531254>.*

(Continued)

*Primary Examiner* — Thuy Dao
*Assistant Examiner* — Ziaul A Chowdhury
(74) *Attorney, Agent, or Firm* — Ingrassia Fisher & Lorenz, P.C.

(57) ABSTRACT

Methods and systems are provided for creating custom applications that integrate custom objects in a multi-tenant system. One exemplary method for creating a custom application involves an application server providing a graphical user interface on a client device. The graphical user interface includes a graphical user interface element for receiving an input value for an attribute of the custom application, wherein the application server generates the custom application having the attribute equal to the input value indicated by the graphical user interface element to a client device.

16 Claims, 9 Drawing Sheets

(56) References Cited

U.S. PATENT DOCUMENTS

| | | | |
|---|---|---|---|
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 * | 11/2003 | Zhu et al. | 715/753 |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 * | 2/2005 | Brodersen et al. | 705/7.14 |
| 6,850,949 B2 | 2/2005 | Warner et al. | |
| 7,340,411 B2 | 3/2008 | Cook | |
| 7,620,655 B2 | 11/2009 | Larsson et al. | |
| 7,698,160 B2 | 4/2010 | Beaven et al. | |
| 7,802,230 B1 * | 9/2010 | Mendicino et al. | 717/113 |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,275,836 B2 | 9/2012 | Beaven et al. | |
| 8,671,390 B2 * | 3/2014 | Davydok et al. | 717/116 |
| 2001/0044791 A1 | 11/2001 | Richter et al. | |
| 2002/0029376 A1 * | 3/2002 | Ambrose et al. | 717/113 |
| 2002/0072951 A1 | 6/2002 | Lee et al. | |
| 2002/0082892 A1 | 6/2002 | Raffel | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2002/0198901 A1 * | 12/2002 | Ritchie et al. | 707/201 |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0135805 A1 * | 7/2004 | Gottsacker et al. | 345/751 |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2005/0223022 A1 | 10/2005 | Weissman et al. | |
| 2006/0156278 A1 * | 7/2006 | Reager | 717/104 |
| 2006/0206834 A1 * | 9/2006 | Fisher et al. | 715/777 |
| 2009/0037828 A1 * | 2/2009 | Waite et al. | 715/760 |
| 2010/0077344 A1 * | 3/2010 | Gaffney et al. | 715/788 |
| 2010/0306735 A1 * | 12/2010 | Hoff et al. | 717/109 |
| 2011/0289047 A1 | 11/2011 | Ahuja | |
| 2012/0131104 A1 * | 5/2012 | Beaven et al. | 709/204 |
| 2012/0317504 A1 * | 12/2012 | Patel et al. | 715/762 |

OTHER PUBLICATIONS

Marc Davis et al. "Mobile Media Metadata for Mobile Imaging", [Online], IEEE2004, pp. 1707-1710, [Retrieved from Internet on Oct. 7, 2014], <http://ieeexplore.ieee.org/stamp/stamp.jsp?tp=&arnumber=1394582>.*

David Hicks et al., "Using Meta-Data to Support Customization", [Online], 1999, pp. 1-8, [Retrieved from Internet on Oct. 7, 2014], <http://purl.pt/282/1/v3d2/publications/paddle/paddle-ieee-metadata.pdf>.*

Dorel Nasui et al., "Cloud-Based Application Development Platform for Secure, Intelligent, Interlinked and Interactive Infrastructure", [Online],2013, pp. 473-476, [Retrieved from Internet on Oct. 7, 2014], <http://ieeexplore.ieee.org/stamp/stamp.jsp?tp=&arnumber=6609021>.*

* cited by examiner

CUSTOM APPLICATION CREATION IN MULTI-TENANT SYSTEMS

CROSS-REFERENCE TO RELATED APPLICATION(S)

This application claims the benefit of U.S. Provisional patent application Ser. No. 61/528,594, filed Aug. 29, 2011, the entire content of which is incorporated by reference herein.

TECHNICAL FIELD

Embodiments of the subject matter described herein relate generally to computer systems and networks configured to support applications executing on behalf of multiple tenants, and more particularly, embodiments of the subject matter relate to methods and systems for creating custom applications and related objects in a multi-tenant system.

BACKGROUND

Modern software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" supplied by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application features between multiple sets of users.

In practice, the different tenants often have different types of data and/or different relationships between data that they would like to maintain in the multi-tenant system, along with different types of operations they would like to be able to perform on their data. Accordingly, some multi-tenant systems include an application platform that may be utilized by users to create user-specific (or tenant-specific) objects in the multi-tenant database and accompanying user-specific (or tenant-specific) applications integrating those custom objects and supporting various features with respect to those custom objects (e.g., reports, tables, functions, etc.). However, creating custom objects and custom applications can be difficult and time-consuming for users who are relatively inexperienced with computer programming or are otherwise unfamiliar with the multi-tenant system.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Embodiments of the subject matter described herein generally relate to creating custom applications and custom objects in a multi-tenant database and generating or otherwise providing the custom application to a client device within the multi-tenant system. As used herein, "custom" should be understood as meaning that a respective application or object is user-specific (e.g., only available to a particular subset of users within the multi-tenant system) or tenant-specific (e.g., only available to users associated with a particular tenant in the multi-tenant system), as opposed to "standard" or "universal" applications or objects which are available to all users and/or tenants in the multi-tenant system. As described in greater detail below, in an exemplary embodiment, to create a custom application, a graphical user interface (GUI) that includes GUI elements for defining the names of the custom application and a custom object to be integrated with the custom application is provided to a user on a client device. After the user provides input values for the custom application name and custom object name, metadata defining the structure for a new object type having the custom object name is automatically created (e.g., without additional manual input or otherwise independent of any manual input or other manual intervention) in the multi-tenant database along with metadata defining a tab associated with the custom object type. In this regard, the custom object tab is a graphical affordance associated with the custom object type. After the custom object and custom object tab are created or otherwise instantiated in the multi-tenant database, metadata defining the structure for a new application having the custom application name is automatically created.

In an exemplary embodiment, the metadata for the custom application maintains an association between the custom object tab and one or more additional standard tabs associated with standard objects in the multi-tenant database or standard features and/or functionality within the multi-tenant system. Once the custom application is created or otherwise instantiated in the multi-tenant database, the custom application may be generated and provided to the client device, for example, by displaying a tabbed interface having the custom application name and including the custom object tab having the custom object name and one or more additional standard tabs. The user may subsequently utilize the new custom application to create new instances of the custom object in the multi-tenant database and manipulate the custom objects in the desired manner (e.g., sorting the custom objects by one or more fields of metadata, generating reports, and the like).

Figure 1:
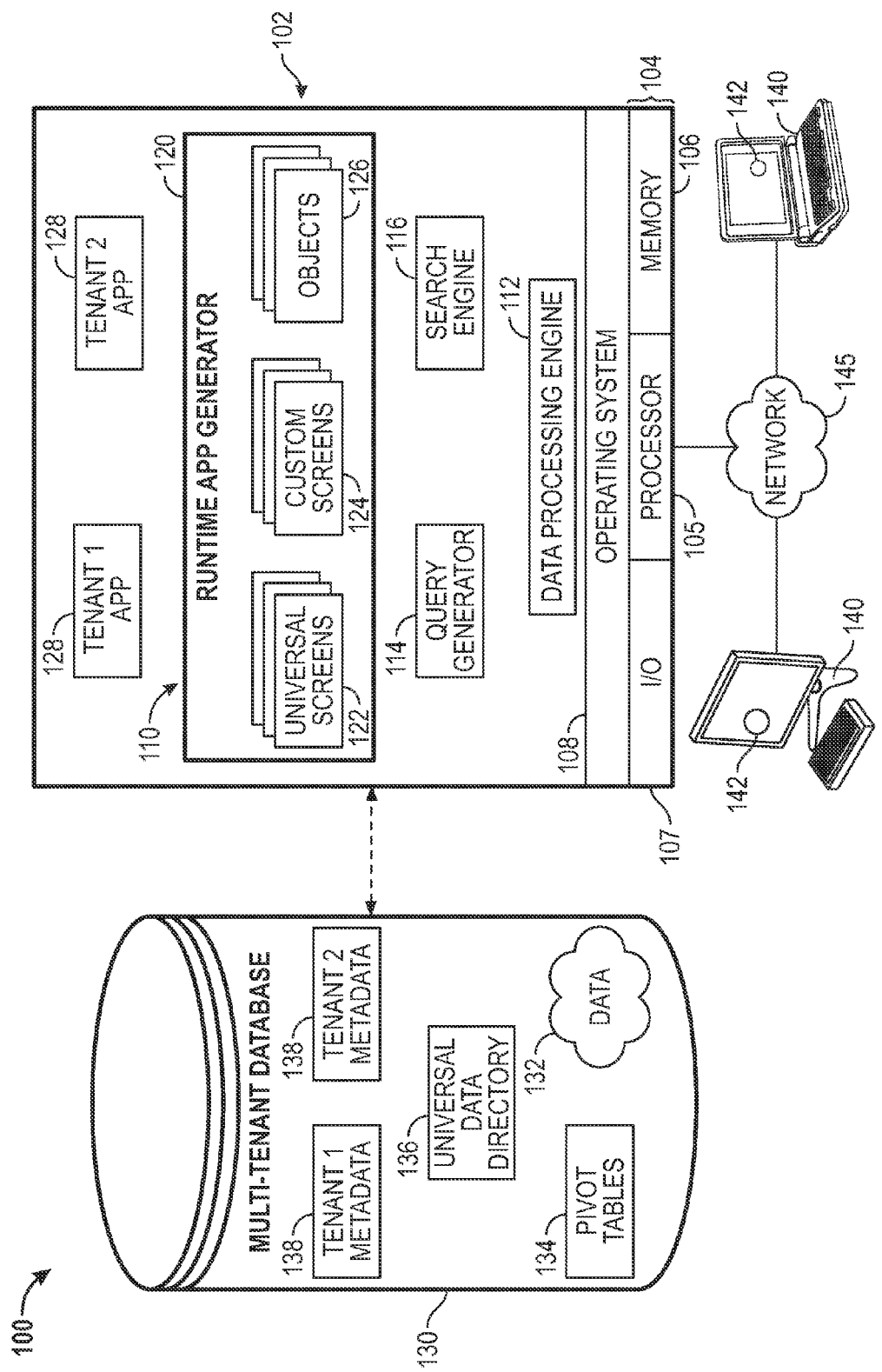
FIG. 1 is a block diagram of an exemplary multi-tenant system.

Turning now to FIG. 1, an exemplary multi-tenant system 100 includes an application server 102 that dynamically creates and supports virtual applications 128 based upon data 132 from a common database 130 that is shared between multiple tenants, alternatively referred to herein as a multi-tenant database. Data and services generated by the virtual applications 128 are provided via a network 145 to any number of client devices 140, as desired. Each virtual application 128 is suitably generated at run-time using a common application platform 110 that securely provides access to the data 132 in the database 130 for each of the various tenants subscribing to the multi-tenant system 100. In accordance with one non-limiting example, the multi-tenant system 100 is implemented in the form of a multi-tenant customer relationship management (CRM) system that can support any number of authenticated users of multiple tenants.

As used herein, a "tenant" or an "organization" should be understood as referring to a group of one or more users that shares access to common subset of the data within the multi-tenant database 130. In this regard, each tenant includes one or more users associated with, assigned to, or otherwise belonging to that respective tenant. To put it another way, each respective user within the multi-tenant system 100 is associated with, assigned to, or otherwise belongs to a particular tenant of the plurality of tenants supported by the multi-tenant system 100. Tenants may represent customers, customer departments, business or legal organizations, and/or any other entities that maintain data for particular sets of users within the multi-tenant system 100. Although multiple tenants may share access to the server 102 and the database 130, the particular data and services provided from the server 102 to each tenant can be securely isolated from those provided to other tenants. The multi-tenant architecture therefore allows different sets of users to share functionality and hardware resources without necessarily sharing any of the data 132 belonging to or otherwise associated with other tenants.

The multi-tenant database 130 is any sort of repository or other data storage system capable of storing and managing the data 132 associated with any number of tenants. The database 130 may be implemented using any type of conventional database server hardware. In various embodiments, the database 130 shares processing hardware 104 with the server 102. In other embodiments, the database 130 is implemented using separate physical and/or virtual database server hardware that communicates with the server 102 to perform the various functions described herein. In an exemplary embodiment, the database 130 includes a database management system or other equivalent software capable of determining an optimal query plan for retrieving and providing a particular subset of the data 132 to an instance of virtual application 128 in response to a query initiated or otherwise provided by the virtual application 128 (e.g., via query generator 114).

In practice, the data 132 may be organized and formatted in any manner to support the application platform 110. In various embodiments, the data 132 is suitably organized into a relatively small number of large data tables to maintain a semi-amorphous "heap"-type format. The data 132 can then be organized as needed for a particular virtual application 128. In various embodiments, conventional data relationships are established using any number of pivot tables 134 that establish indexing, uniqueness, relationships between entities, and/or other aspects of conventional database organization as desired. Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants. Tenant-specific formatting, functions and other constructs may be maintained as tenant-specific metadata 138 for each tenant, as desired. Rather than forcing the data 132 into an inflexible global structure that is common to all tenants and applications, the database 130 is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

The server 102 is implemented using one or more actual and/or virtual computing systems that collectively provide the dynamic application platform 110 for generating the virtual applications 128. For example, the server 102 may be implemented using a cluster of actual and/or virtual servers operating in conjunction with each other, typically in association with conventional network communications, cluster management, load balancing and other features as appropriate. The server 102 operates with any sort of conventional processing hardware 104, such as a processor 105, memory 106, input/output features 107 and the like. The input/output features 107 generally represent the interface(s) to networks (e.g., to the network 145, or any other local area, wide area or other network), mass storage, display devices, data entry devices and/or the like. The processor 105 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 106 represents any non-transitory short or long term storage or other computer-readable media capable of storing programming instructions for execution on the processor 105, including any sort of random access memory (RAM), read only memory (ROM), flash memory, magnetic or optical mass storage, and/or the like. The computer-executable programming instructions, when read and executed by the server 102 and/or processor 105, cause the server 102 and/or processor 105 to create, generate, or otherwise facilitate the application platform 110 and/or virtual applications 128 and perform one or more additional tasks, operations, functions, and/or processes described herein. It should be noted that the memory 106 represents one suitable implementation of such computer-readable media, and alternatively or additionally, the server 102 could receive and cooperate with external computer-readable media (not separately shown) that is realized as a portable or mobile component or platform, e.g., a portable hard drive, a USB flash drive, an optical disc, or the like.

The application platform 110 is any sort of software application or other data processing engine that generates the virtual applications 128 that provide data and/or services to the client devices 140. In a typical embodiment, the application platform 110 gains access to processing resources, communications interfaces and other features of the processing hardware 104 using any sort of conventional or proprietary operating system 108. The virtual applications 128 are typically generated at run-time in response to input received from the client devices 140. For the illustrated embodiment, the application platform 110 includes a bulk data processing engine 112, a query generator 114, a search engine 116 that provides text indexing and other search functionality, and a runtime application generator 120. Each of these features may be implemented as a separate process or other module, and many equivalent embodiments could include different and/or additional features, components or other modules as desired.

The runtime application generator 120 dynamically builds and executes the virtual applications 128 in response to specific requests received from the client devices 140. The virtual applications 128 are typically constructed in accordance with the tenant-specific metadata 138, which describes the particular tables, reports, interfaces and/or other features of the particular application 128. In various embodiments, each virtual application 128 generates dynamic web content that can be served to a browser or other client program 142 associated with its client device 140, as appropriate.

The runtime application generator 120 suitably interacts with the query generator 114 to efficiently obtain multi-tenant data 132 from the database 130 as needed in response to input queries initiated or otherwise provided by users of the client devices 140. In a typical embodiment, the query generator 114 considers the identity of the user requesting a particular function (along with the user's associated tenant), and then builds and executes queries to the database 130 using system-wide metadata 136, tenant specific metadata 138, pivot tables 134, and/or any other available resources. The query generator 114 in this example therefore maintains security of the common database 130 by ensuring that queries are consistent with access privileges granted to the user and/or tenant that initiated the request.

Still referring to FIG. 1, the data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc.

In operation, the application platform 110 may be utilized by users supported by the multi-tenant system 100 to create data-driven virtual applications 128, as described in greater detail below in the context of the custom application creation process 200 FIG. 2. Such virtual applications 128 may make use of interface features such as tenant-specific screens 124, universal screens 122 or the like. Any number of tenant-specific and/or universal objects 126 may also be available for integration into tenant-developed virtual applications 128. The data 132 associated with each virtual application 128 is provided to the database 130, as appropriate, and stored until it is requested or is otherwise needed, along with the metadata 138 that describes the particular features (e.g., reports, tables, functions, etc.) of that particular custom virtual application 128. In an exemplary embodiment, a virtual application 128 includes one or more custom objects 126 created or otherwise defined by a user and/or tenant, as described in greater detail below in the context of the custom application creation process 200 of FIG. 2. In this regard, for each custom object 126, information pertaining to its object type and its associated fields are maintained as metadata 138 in the database 130 while the values of the fields for each instance of that respective object 126 are maintained as data 132 in the multi-tenant database 130. In this regard, the metadata 138 for a custom object 126 defines the structure (e.g., the formatting, functions and other constructs) of that respective custom object 126 and the various fields associated therewith. For example, the metadata 138 may include information pertaining to the fields of a custom object, such as, for example, information pertaining to the field type for individual fields, default value formulas for individual fields, and the like.

Still referring to FIG. 1, the data and services provided by the server 102 can be retrieved using any sort of personal computer, mobile telephone, tablet or other network-enabled client device 140 on the network 145. In an exemplary embodiment, the client device 140 includes a display device, such as a monitor, screen, or another conventional electronic display capable of graphically presenting data and/or information retrieved from the multi-tenant database 130, as described in greater detail below. Typically, the user operates a conventional browser application or other client program 142 executed by the client device 140 to contact the server 102 via the network 145 using a networking protocol, such as the hypertext transport protocol (HTTP) or the like. The user typically authenticates his or her identity to the server 102 to obtain a session identifier ("SessionID") that identifies the user in subsequent communications with the server 102. When the identified user requests access to a virtual application 128, the runtime application generator 120 suitably creates the application at run time based upon the metadata 138, as appropriate. As noted above, the virtual application 128 may contain Java, ActiveX, or other content that can be presented using conventional client software running on the client device 140; other embodiments may simply provide dynamic web or other content that can be presented and viewed by the user, as desired. The query generator 114 suitably obtains requested subsets of data 132 from the database 130 as needed to populate the tables, reports or other features of the particular virtual application 128.

Figure 2:
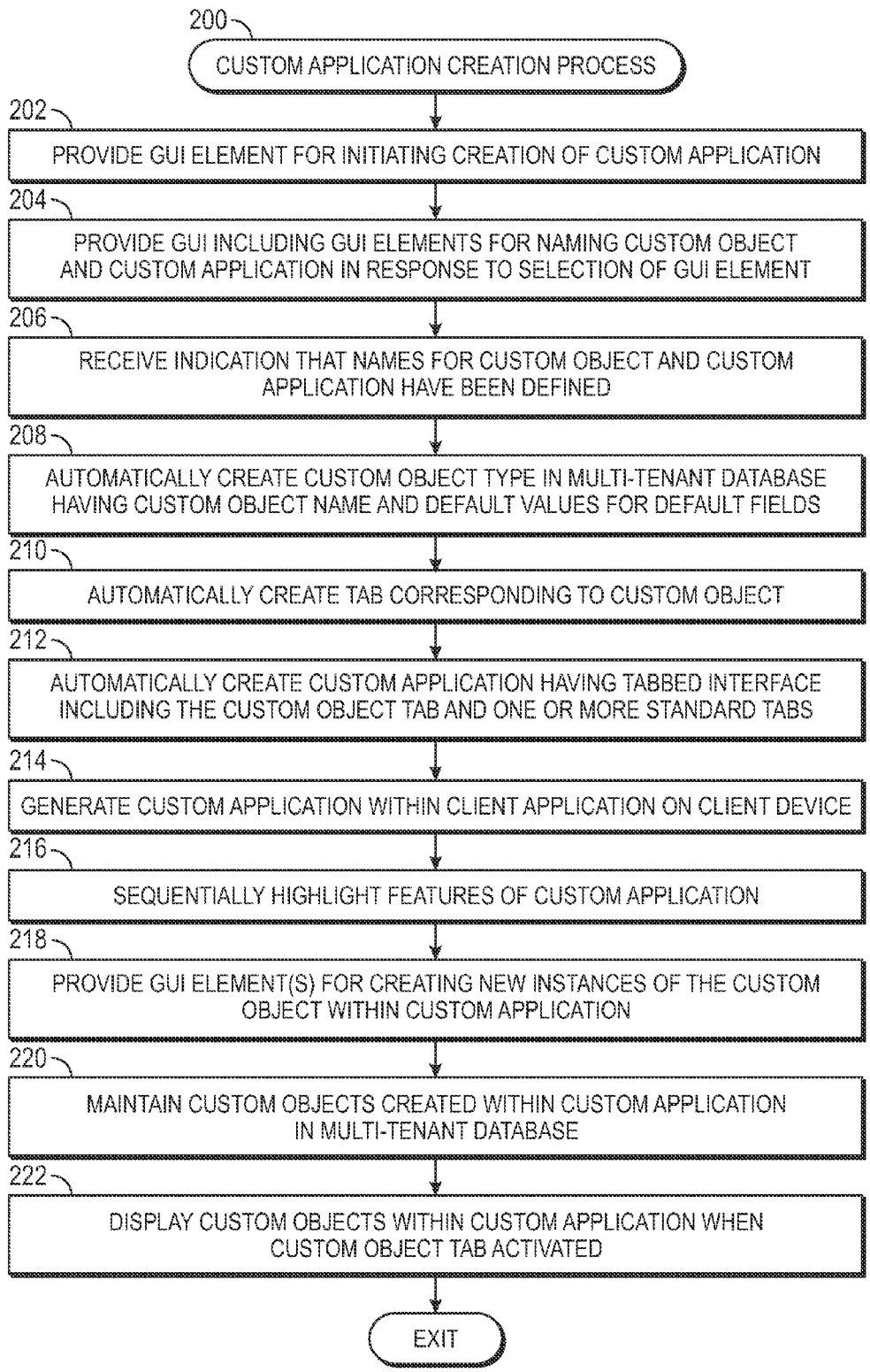
FIG. 2 is a flow diagram of an exemplary custom application creation process suitable for use with the multi-tenant system of FIG. 1 in accordance with one or more exemplary embodiments.

FIG. 2 depicts an exemplary custom application creation process 200 suitable for implementation by a multi-tenant system to allow a user and/or tenant create custom (e.g., tenant-specific and/or user-specific) applications that incorporate or otherwise include custom objects for formatting and/or organizing that user's and/or tenant's data maintained in a multi-tenant database. The various tasks performed in connection with the custom application creation process 200 may be performed by software, hardware, firmware, or any combination thereof. For illustrative purposes, the following description may refer to elements mentioned above in connection with FIG. 1. In practice, portions of the custom application creation process 200 may be performed by different elements of the multi-tenant system 100, such as, for example, the application server 102, the application platform 110, the multi-tenant database 130, the virtual application 128, the client device 140 and/or the client application 142. It should be appreciated that the custom application creation process 200 may include any number of additional or alternative tasks, the tasks need not be performed in the illustrated order and/or the tasks may be performed concurrently, and/or the custom application creation process 200 may be incorporated into a more comprehensive procedure or process having additional functionality not described in detail herein. Moreover, one or more of the tasks shown and described in the context of FIG. 2 could be omitted from a practical embodiment of the custom application creation process 200 as long as the intended overall functionality remains intact.

Referring to FIG. 2, and with continued reference to FIG. 1, in an exemplary embodiment, the custom application creation process 200 begins by providing a selectable GUI element for initiating creation of a custom application (task 202). For example, the user of the client device 140 manipulates or otherwise operates the client application 142 to access the application platform 110 and/or the application server 102, wherein the application platform 110 presents or otherwise displays, within the client application 142, a listing of the applications 128 available to that user along with a button or another selectable GUI element for initiating automatic creation of a new custom application, as described in greater detail below in the context of FIG. 3.

Still referring to FIG. 2, in response to receiving indication of a desire by the user to create a custom application, the custom application creation process 200 continues by displaying, presenting or otherwise providing a GUI that includes GUI elements adapted to allow a user to indicate or otherwise identify the names (or other identifiers) for the custom object and custom application to be automatically created (task 204). In this regard, in an exemplary embodiment, in response to the user selecting the button for initiating creation of a custom application, the application platform 110 automatically displays or otherwise presents a GUI, such as a modal window or pop-up window overlying the list of the applications available to the user, wherein the GUI includes GUI elements, such as text boxes or the like, that enable a user to provide a name the user would like to assign or otherwise associate with the new custom application along with a name the user would like to assign or otherwise associate with the new custom object to be integrated with the new custom application, as described in greater detail below in the context of FIG. 4. In this regard, in exemplary embodiments, the modal window includes GUI elements for various declensions of the name of the new custom object (e.g., singular form, plural form, masculine and/or feminine forms, and the like). As described in greater detail below in the context of FIGS. 4-5, the user of the client device 140 utilizes the text boxes to provide the name that the user would like to associate with the custom application along with the name that the user would like to associate with the custom object to be integrated with the custom application, wherein the application platform 110 displays or otherwise presents a preview of the custom application within the modal window to illustrate, to the user, how the name of the custom application and the name(s) of the custom object will be displayed when the custom application is subsequently generated.

In an exemplary embodiment, the custom application creation process 200 continues by receiving indication that the names for the custom application and custom object have been provided by the user, and in response to receiving the indication, automatically creating or otherwise instantiating a new custom object type in the multi-tenant database having the custom object name provided by the user (tasks 206, 208). In this regard, in an exemplary embodiment, the application platform 110 present or otherwise displays, within the modal window, a button or another selectable GUI element for indicating that the user is satisfied with the names provided for the custom application and the custom object using the other GUI elements presented within the modal window. In response to the user selecting the button, the application platform 110 automatically creates a new object type in the multi-tenant database 130 corresponding to the custom object. In this regard, the application platform 110 updates or otherwise modifies the metadata 138 associated with the user and/or tenant to create metadata defining the structure of a new custom object type having object name data fields corresponding to the custom object name (and declensions thereof) provided by the user along with a number of default object data fields. For example, the application platform 110 may provide the custom object type with fields for indicating the date an instance of the custom object was created (e.g., a creation date field), the date an instance of the custom object was most recently modified (e.g., a modified date field), the name of an instance of the custom object (e.g., a name field), and the like. In some embodiments, the application platform 110 automatically assigns the input values for the custom object name(s) to the name data fields of the custom object type and assigns default values to the default object data fields of the custom object type. For example, the application platform 110 may initially assign null values to the date fields (e.g., creation date, modification date, and the like). Additionally, in some embodiments, the application platform 110 may also automatically assign a set of default permissions and/or a set of default workflow rules for the custom object type.

Still referring to FIG. 2, in an exemplary embodiment, the custom application creation process 200 continues by automatically creating a tab corresponding to the custom object and automatically creating the custom application that includes the custom object tab and one of more standard tabs (tasks 210, 212). In an exemplary embodiment, the application platform 110 randomly selects a theme (or motif) from a plurality of available themes supported by the application platform 110 that are not currently utilized by an application 128 associated with or otherwise available to the user and/or tenant creating the custom application, and creates or otherwise instantiates metadata for a new tab having the custom object name associated therewith utilizing the selected theme. In this regard, the fields of metadata for the new tab corresponding to visual characteristics of the tab (e.g., font color, tab color, icon for the custom object, and the like) are set to values corresponding to the selected theme, so that the custom object tab is subsequently displayed in a color corresponding to the tab color provided by the selected theme and includes the custom object name displayed in the font color corresponding to the selected theme, as described in greater detail below. After creating the custom object tab, the application platform 110 automatically creates a new application in the multi-tenant database 130 corresponding to the custom application that integrates the new custom object and/or the new custom object tab. In this regard, the application platform 110 updates or otherwise modifies the metadata 138 associated with the user and/or tenant to create metadata defining the structure of a new custom application having an application name data field equal to the custom application name. In an exemplary embodiment, the custom application includes a tabbed interface that includes the custom object tab associated with the new custom object type and one or more standard tabs associated with standard objects and/or features supported by the multi-tenant system 100. In this regard, the metadata 138 for the new custom application maintains an association between the metadata for the custom object tab and the one or more standard tabs to implement the tabbed interface corresponding to the new custom application.

In an exemplary embodiment, the custom application creation process 200 continues by generating or otherwise providing the automatically created custom application to the user (task 214). In this regard, after automatically creating the custom object type, the custom object tab, and the custom application in the multi-tenant database 130, the application platform 110 may update the modal window to indicate the custom application was successfully created and include a button or another GUI element selectable by the user to initiate execution of the custom application. In response to the user selecting the button, the application platform 110 generates or otherwise presents the custom application within the client application 142 on the client device 140, for example, by displaying a tabbed interface including the custom object tab and standard tabs associated with that custom application. When the custom object tab is activated or otherwise selected within the custom application, a display region of the tabbed interface corresponds to the custom object type, as described in greater detail below. In an exemplary embodiment, the custom application creation process 200 continues by sequentially highlighting various features and/or GUI elements of the newly created custom application (task 216). As described in greater detail below, the application platform 110 may initiate a walkthrough of the custom application by visually indicating the custom object tab and other GUI elements within the custom application in a sequential manner to illustrate how the custom application may be utilized by the user.

Still referring to FIG. 2, after the custom application creation process 200 sequentially highlights the GUI elements and/or features of the custom application, the user may utilize the custom application to provide data to be stored in the multi-tenant database and/or manipulate data stored in the multi-tenant database. In an exemplary embodiment, the custom application creation process 200 provides GUI elements within the custom application adapted to allow a user to create instances of the custom object that are maintained in the multi-tenant database and displays instances of custom object within the custom application when the custom object tab is selected (tasks 218, 220, 222). As described in greater detail below in the context of FIG. 9, when the custom object tab is selected or otherwise activated, the application platform 110 displays or otherwise presents a button or another selectable GUI element within the display region of the tabbed interface that allows a user to create a new instance of the custom object in the multi-tenant database 130. After the new custom object button is selected, the application platform 110 may display or otherwise present additional GUI elements (e.g., text boxes, drop-down lists, buttons, or the like) that allow the user to input or otherwise provide data for the various fields of data for the new instance of the custom object. For example, the application platform 110 may display text boxes corresponding to the editable fields of the custom object that allow the user to provide values for those fields along with a button that may be selected by the user after providing the desired data for the custom object to initiate creation of the new instance of the custom object in the multi-tenant database 130. The application platform 110 automatically creates a new instance of the custom object having the user-provided values for the editable fields of the custom object with the remaining fields of the custom object having default values that are automatically provided and/or configured by the custom application creation process 200 as described above. Once the new instance of the custom object is created in the multi-tenant database 130, the application platform 110 may display a graphical representation of the instance of the custom object within the custom application (e.g., within the display region of the tabbed interface) when the custom object tab is selected and/or activated. For example, the application platform 110 may obtain values for one or more fields of the custom object from the multi-tenant database 130 and display those values within the custom application.

FIGS. 3-9 illustrate an exemplary sequence of displays that may be graphically presented by the application platform 110 within a client application 142 executing on a client device 140 in connection with an exemplary embodiment of the custom application creation process 200 of FIG. 2. In this regard, the displays illustrated in FIGS. 3-9 represent a portion of the visual area on the electronic display device associated with client device 140 that contains graphical representations or images associated with the client application 142 which generates, conveys, renders, or otherwise displays graphical representations or images based on data received from the application platform 110 and/or a virtual application 128. In practice, the displays may be realized as or otherwise derived from one or more screens (e.g., screens 122, 124) integrated with or otherwise supported by the application platform 110 and/or virtual application 128.

Figure 3:
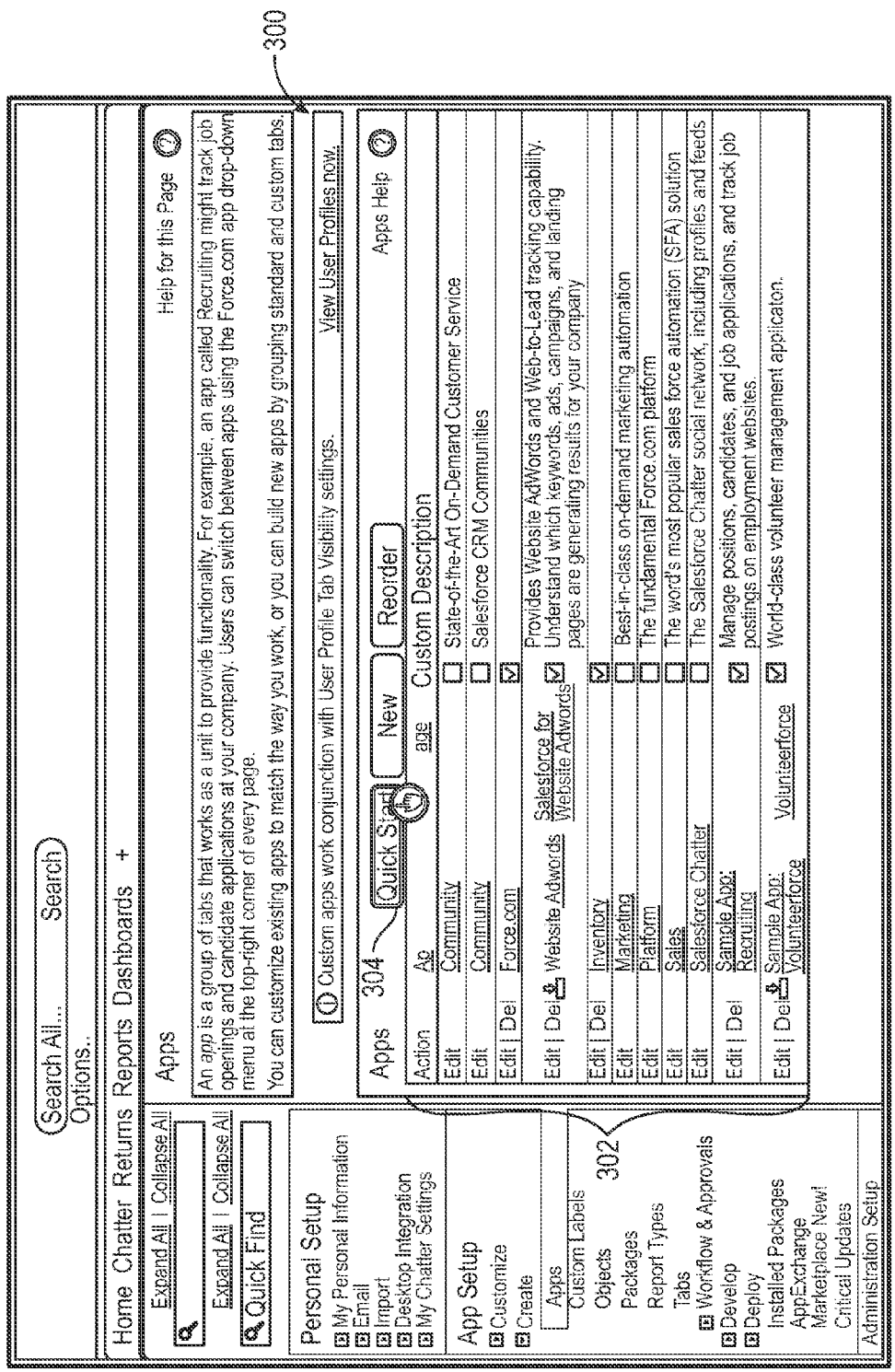
FIGS. 3-9 illustrate exemplary displays that may be presented on a client computing device in the multi-tenant system of FIG. 1 in connection with the custom application creation process of FIG. 2 in accordance with one or more exemplary embodiments.
Figure 4:
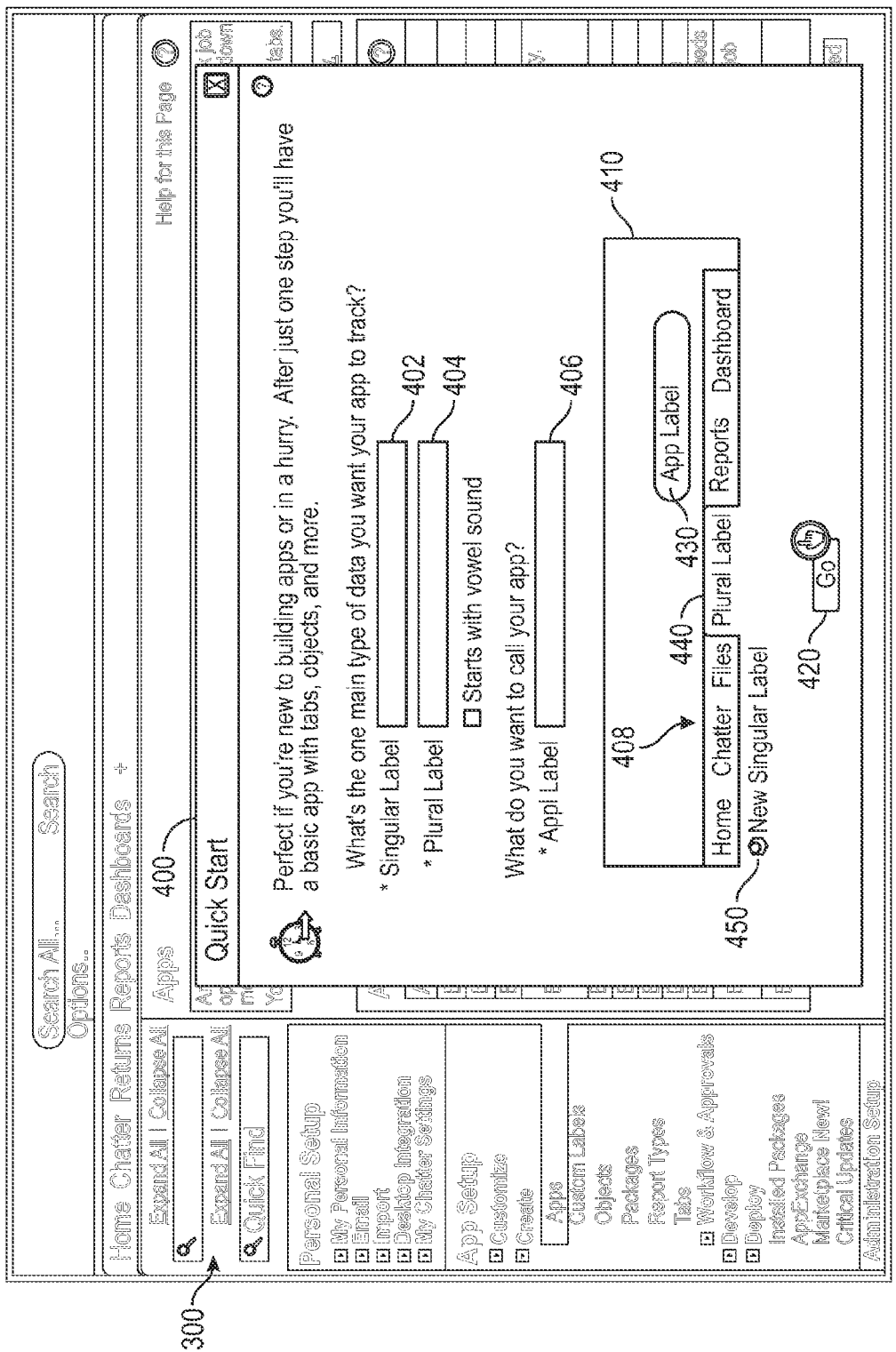
Figure 5:
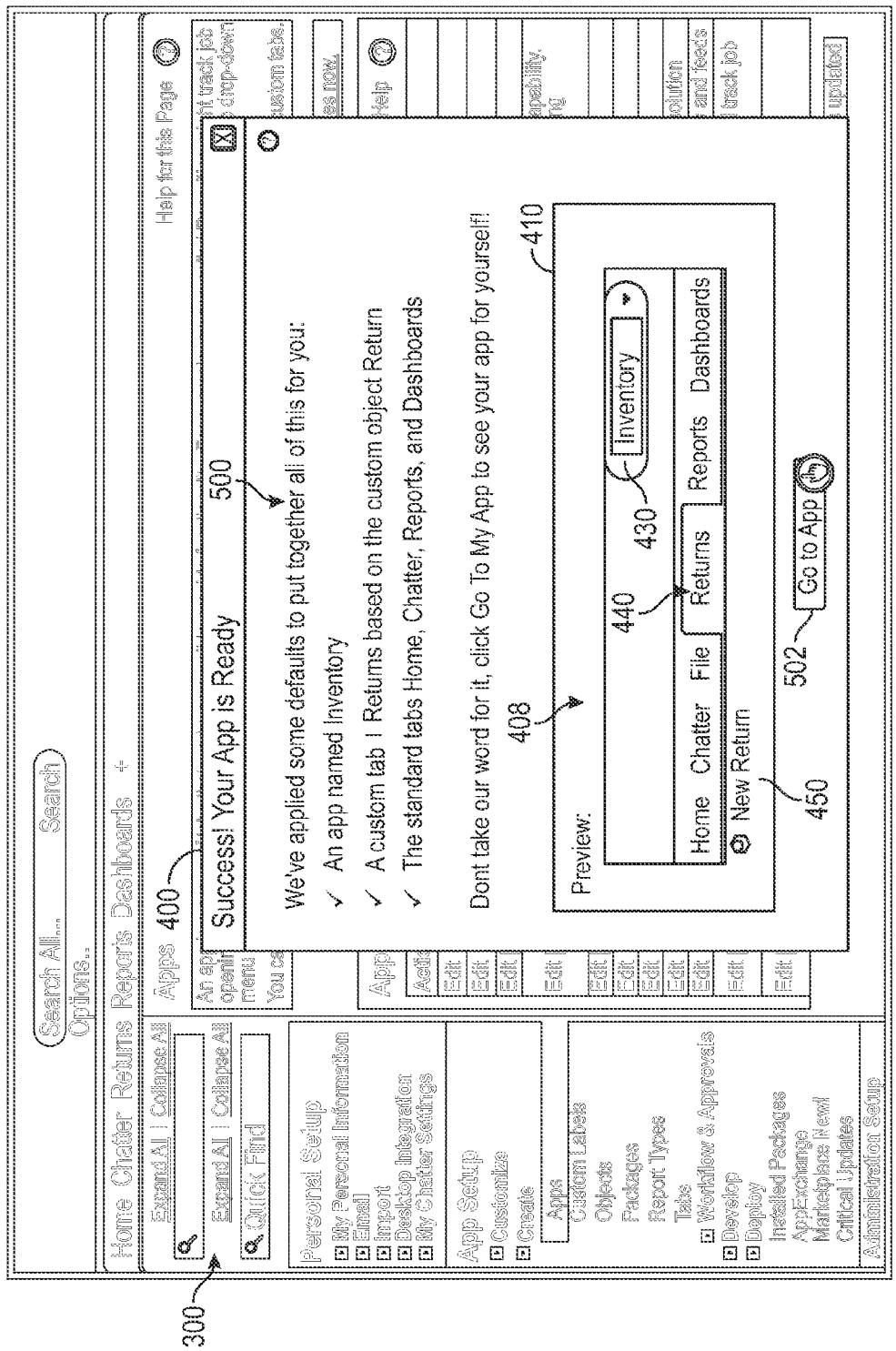

Referring to FIGS. 3-5, in an exemplary embodiment, the application platform 110 provides, presents, or otherwise displays an application display 300 within the client application 142 on the client device 140 that includes a list 302 of the virtual applications 128 available to the user of the client device 140. Within the application display 300, the application platform 110 provides, presents, or otherwise displays a GUI element 304, such as a button, that, when selected by the user of the client device 140, causes the application platform 110 to initiate the process of automatically creating a new custom application. As illustrated by FIG. 4, when the button 304 is selected by the user, the application platform 110 automatically displays or otherwise presents a modal window 400 overlying the application display 300 that includes text boxes 402, 404, 406 for receiving the name of the custom application being created along with the names for the new custom object to be integrated with the new custom application. In an exemplary embodiment, the application platform 110 displays or otherwise presents a preview 408 of the new custom application within the modal window 402 in a region 410 below the text boxes 402, 404, 406 that illustrates how the names provided in the text boxes 402, 404, 406 will be displayed within the custom application along with a button 420 that the user may select after providing the names for the custom application and custom object. As illustrated by FIG. 5, when the user provides a name for the custom application within the text box 406, the application platform 110 updates the custom application preview 408 so that the application selection drop-down list 430 indicates the custom application is selected. Likewise, when the user provides the names for the custom object within the text boxes 402, 404, the application platform 110 updates the custom application preview 408 so that the custom object tab 440 and the new custom object button 450 indicate the custom object names provided by the user in the text boxes 402, 404.

After the user selects the button 420 to create the custom application, the application platform 110 automatically creates or otherwise instantiates, in the multi-tenant database 130, a new object type corresponding to the custom object (e.g., having the user-provided object name with default fields automatically assigned default values), a tab corresponding to the custom object (e.g., having the user-provided object name with a randomly selected theme), and a custom application having the custom application name and a tabbed interface including one or more standard tabs in addition to the custom object tab, as described above in the context of the custom application creation process 200 of FIG. 2 (e.g., tasks 208, 210, 212). In this regard, the application platform 110 updates or otherwise modifies the metadata 138 associated with the user and/or tenant to create metadata defining the structure of a new custom object type having name data fields set to be equal to the input custom object names provided in text boxes 402, 404 along with a number of default object data fields that are automatically assigned default values. The application platform 110 continues by updating or otherwise modifying the metadata 138 to define the structure for a custom object tab having an object name data field equal to the plural custom object name provided in text box 404 and a theme that is randomly selected from a plurality of available themes for the user (e.g., themes supported by the multi-tenant system 100 that are not assigned to or associated with other virtual applications 128 available to the user). Additionally, the metadata for the custom object tab defines the GUI elements and/or other text associated with the custom object to be presented in a display region associated with the custom object tab when the custom object tab is activated or otherwise selected, as described in greater detail below. Lastly, the application platform 110 updates or otherwise modifies the metadata 138 to define the structure of a new application having a name data field equal to the custom application name provided in text box 406 and a tabbed interface including the custom object tab and one or more additional standard tabs supported by the multi-tenant system 100. As illustrated in FIG. 5, after creating the custom application, the application platform 110 may update the modal window 400 by removing the text boxes 402, 404, 406 from the display and displaying text 500 that indicates the "Inventory" custom application and "Return" custom object have been created in the multi-tenant database 130. Additionally, the application platform 110 displays or otherwise presents a button 502 that may be selected by the user to generate the "Inventory" custom virtual application within the client application 142.

Figure 6:
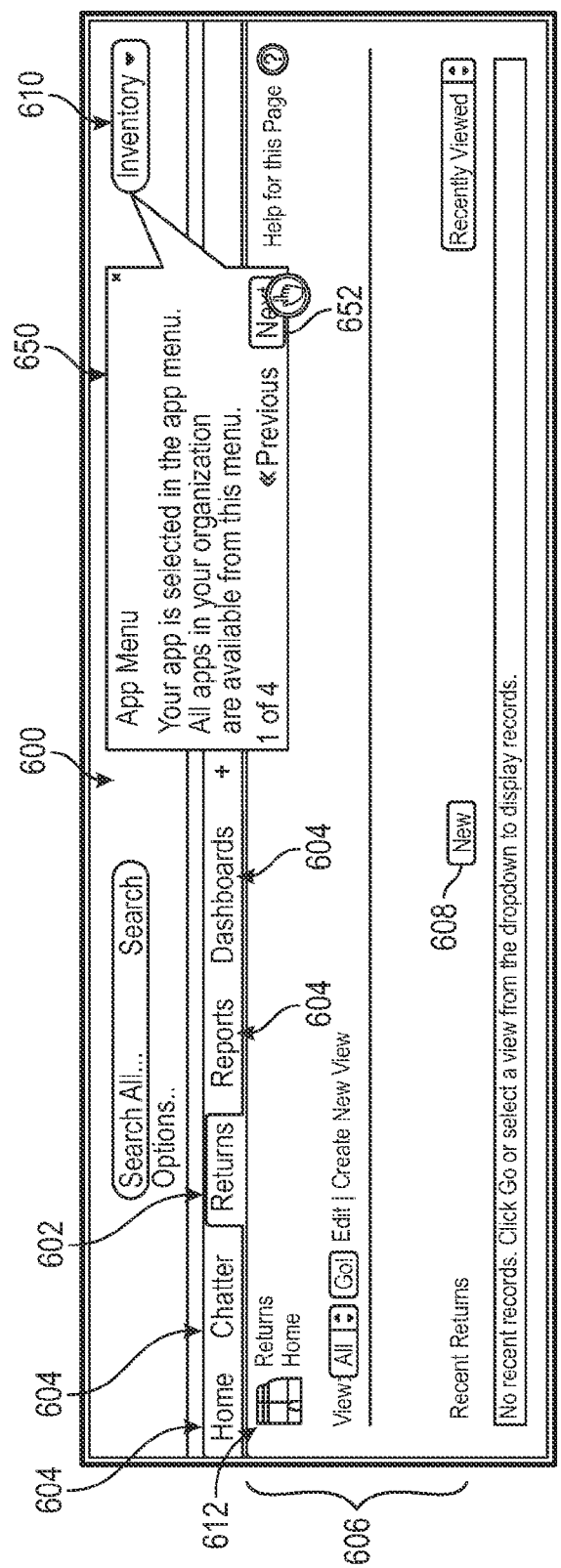
Figure 7:
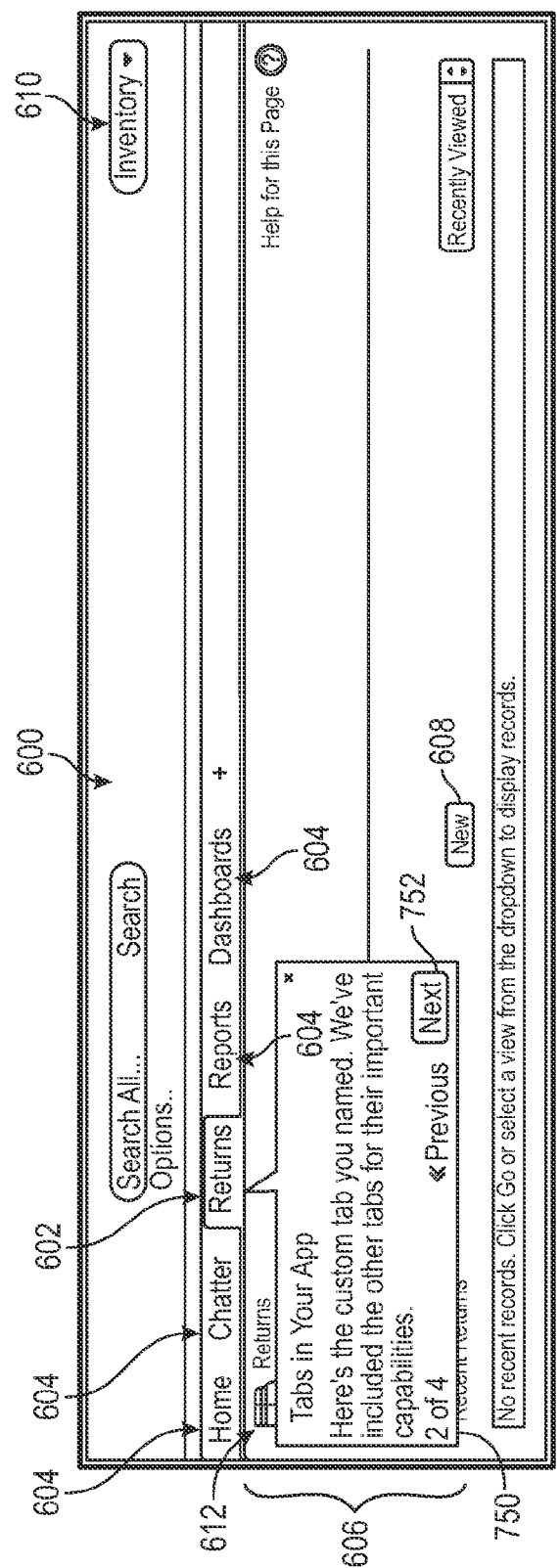
Figure 8:
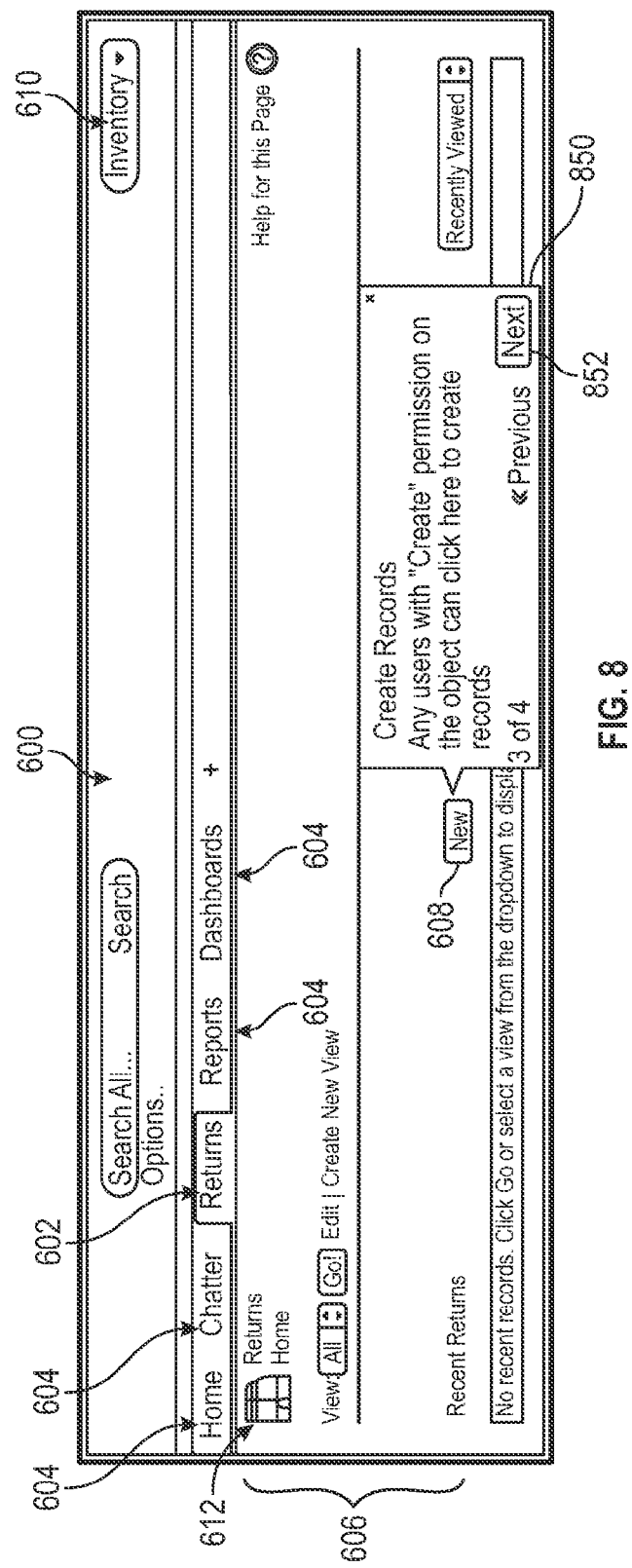

Turning now to FIGS. 6-8, in response to selection of the button 502 by the user, the application platform 110 removes the modal window 400, automatically generates or otherwise executes the "Inventory" custom application 128, and provides the custom application 128 to the client device 140 by presenting or otherwise displaying a tabbed interface display 600 within the client application 142 that corresponds to the set of tabs associated with the custom application 128. The tabbed interface display 600 includes the "Returns" custom object tab 602 that was automatically created by the application platform 110 along with the standard tabs 604 associated with the custom application 128. As illustrated, in an exemplary embodiment, the tabbed interface display 600 is initially configured so that the custom object tab 602 is activated or otherwise selected by default, such that a display region 606 of the tabbed interface display 600 corresponds to the "Return" custom object and includes GUI elements and/or other information corresponding to the "Return" custom object type. In this regard, the display region 606 includes a button 608 adapted to allow the user to create a new instance of the custom object type (e.g., a new "Return" object) in the multi-tenant database 130 along with an icon 612 corresponding to the custom object type that was randomly selected by the application platform 110 when automatically creating the custom object tab 602. The tabbed interface display 600 also includes an application selection drop-down list 610 that indicates that the tabbed interface display 600 corresponds to the newly created "Inventory" custom application 128. The "Return" custom object tab 602 is rendered or otherwise displayed in accordance with the theme (e.g., using the colors specified by the theme) that was randomly selected by the application platform 110 when creating the custom application 128.

As illustrated in the sequence of the tabbed interface display 600 of FIGS. 6-8, when the custom application 128 is initially generated, the application platform 110 sequentially highlights the elements and/or features of the custom application 128 to the user. For example, the application platform 110 may initially display a text bubble 650 proximate the application selection drop-down 610 that points to or otherwise indicates the application selection drop-down 610 and includes explanatory text pertaining to the application selection drop-down 610 along with a button 652 that allow a user to advance the walkthrough of the custom application. When the button 652 is selected, the application platform 110 automatically removes the bubble 650 and advances the walkthrough sequence by displaying a text bubble 750 proximate the custom object tab 602 that points to or otherwise indicates the custom object tab 602 includes explanatory text pertaining to the custom object tab 602 along with a button 752 that allow a user to advance the walkthrough. In the illustrated embodiment, then the button 752 is selected, the application platform 110 automatically removes the bubble 750 and advances the walkthrough sequence by displaying a text bubble 850 proximate the new custom object button 608 that points to or otherwise indicates the new custom object button 608 includes explanatory text pertaining to the new custom object button 608.

Figure 9:
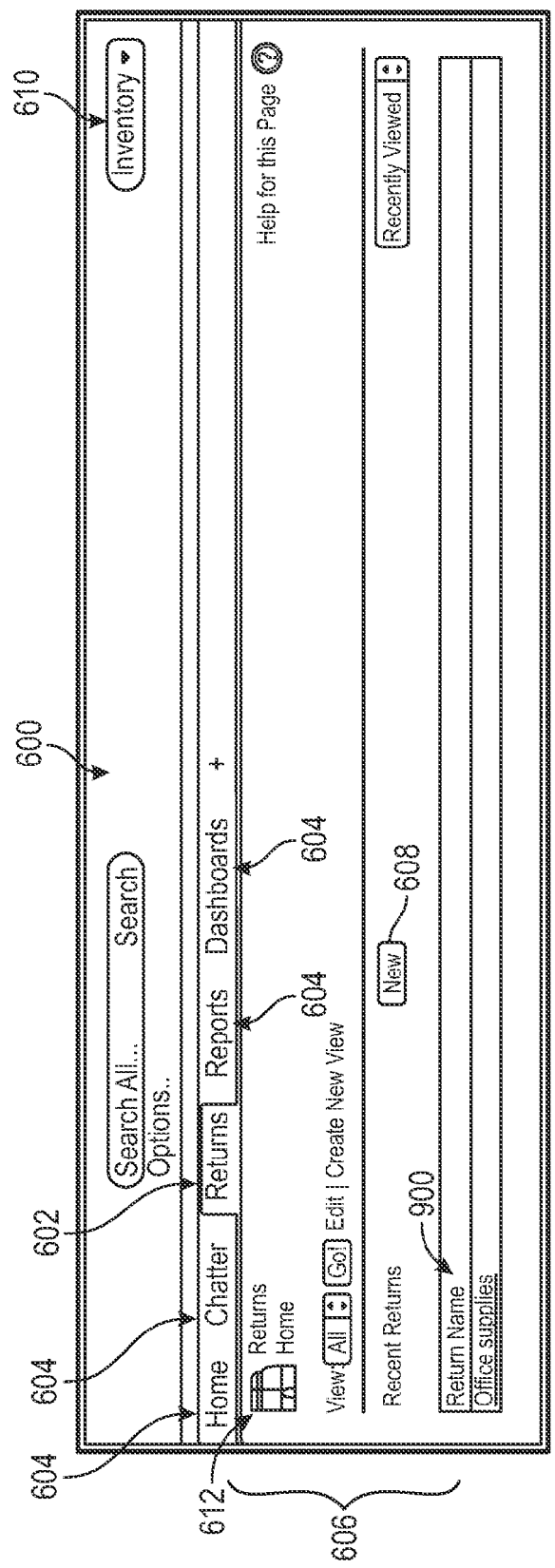

Turning now to FIG. 9, in an exemplary embodiment, the user may select or otherwise activate the new custom object button 608 to create a new instance of the "Return" custom object in the multi-tenant database 130. As described above, when the user selects the new custom object button 608, the application platform 110 displays GUI elements adapted to allow the user to provide values for various editable fields of the "Return" custom object. Once the user is done providing values for the fields of the new instance of the "Return" custom object, the application platform 110 automatically creates a new instance of the "Return" object type in the multi-tenant database 130 having the user-provided values for the editable fields of the "Return" object. As illustrated in FIG. 9, when the user finishes creating an instance of the "Return" object in the multi-tenant database 130, the application platform 110 removes the GUI elements for defining the new "Return" object from the display and updates the display region 606 to display a graphical representation of the new instance of the "Return" custom object. For example, the application platform 110 may obtain the value for a field of the "Return" object (e.g., the name field) from the multi-tenant database 130 and display an entry 900 for that instance of the "Return" object in the display region 606 that includes the value obtained from the multi-tenant database 130 for that particular field of the "Return" object type (e.g., "Office supplies"). It will be appreciated that in practice, the display region 606 may include additional columns for additional fields of the "Return" object, wherein the application platform 110 obtains values for those additional fields for each displayed instance of the "Return" object. In various embodiments, to view additional fields of a "Return" object, the user may select the entry 900 for that instance of the "Return" object, and in response to selection of the entry 900, the application platform 110 may obtain, from the multi-tenant database 130, values for additional fields of that instance of the "Return" object which are not displayed in the display region 606 and present or otherwise display a GUI that includes those obtained values. Additionally, the user may utilize the standard tabs 604 or other features of the "Inventory" custom application 128 to manipulate or otherwise perform operations on the instances of the "Return" custom object, for example, to sort and/or filter instances of the "Return" custom object by various fields of the "Return" custom object, generate reports, and the like.

It will be appreciated that the foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to computer programming, computer networking, application virtualization, multi-tenancy, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In this regard, the subject matter described herein can be implemented in the context of any computer-implemented system and/or in connection with two or more separate and distinct computer-implemented systems that cooperate and communicate with one another. That said, in exemplary embodiments, the subject matter described herein is implemented in conjunction with a virtual customer relationship management (CRM) application in a multi-tenant environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for creating a new custom application, the method comprising:
providing, by an application server, a graphical user interface on a client device coupled to the application server, the graphical user interface including a graphical user interface element for receiving an input value for an attribute of the new custom application;
creating, by the application server, first metadata in a database, the first metadata defining a structure for the new custom application, the first metadata including a field corresponding to the attribute, wherein the field of the first metadata is equal to the input value;
providing a second graphical user interface element within the graphical user interface for receiving a second input value for a second attribute of a new custom object type to be integrated with the new custom application;
creating, by the application server, second metadata in the database, the second metadata defining a structure for the new custom object type, the second metadata including a second field corresponding to the second attribute, the second field of the second metadata being equal to the second input value, wherein the first metadata maintains an association between the second metadata and third metadata in the database, the third metadata corresponding to a second object; and
generating, by the application server, the new custom application having the attribute equal to the input value, wherein the new custom object type is integrated with the new custom application by displaying a tabbed interface on the client device including a first tab corresponding to the new custom object type and a second tab corresponding to the second object.

2. The method of claim 1, wherein:
providing the graphical user interface comprises displaying a modal window including the graphical user interface element on the client device; and
generating the new custom application comprises displaying the new custom application on the client device.

3. The method of claim 2, further comprising displaying a selectable graphical user interface element within the modal window, wherein the new custom application is displayed in response to selection of the selectable graphical user interface element.

4. The method of claim 1, the second input value comprising an object name, wherein the first tab comprises a custom object tab having the object name.

5. The method of claim 1, further comprising assigning a third field of the second metadata to a default value.

6. The method of claim 1, wherein the new custom application is only available to a subset of users.

7. The method of claim 1, wherein:
the second object is available to all users; and
the new custom object type is only available to a subset of the users.

8. A method of creating applications in a multi-tenant system, the multi-tenant system including an application server providing the applications to a plurality of tenants, the method comprising:
providing, by the application server, a first graphical user interface element for receiving a custom application name on a client device coupled to the application server over a network;
providing, by the application server, a second graphical user interface element for receiving a custom object name on the client device;
creating, by the application server, first metadata for a new custom object type in a multi-tenant database coupled to the application server, the first metadata including a first field equal to the custom object name;
creating, by the application server, second metadata defining a structure for a new application in the multi-tenant database, the second metadata including a second field equal to the custom application name, the second metadata maintaining an association between the first metadata and third metadata maintained in the multi-tenant database, the third metadata corresponding to a second object tab; and generating, by the application server, the new custom application having the custom application name by displaying a tabbed interface on the client device, the tabbed interface including a custom object tab having the custom object name and the second object tab.

9. The method of claim 8, further comprising providing a selectable graphical user interface element on the client device, wherein the first metadata and the second metadata are automatically created in response to selection of the selectable graphical user interface element.

10. The method of claim 8, further comprising:
providing, within the new custom application, a third graphical user interface element for creating a new instance of the new custom object type in the multi-tenant database when the custom object tab is activated.

11. The method of claim 10, wherein creating the first metadata comprises assigning a default value to a second field of the first metadata.

12. The method of claim 8, further comprising providing a selectable graphical user interface element on the client device, wherein generating the application comprises displaying the tabbed interface on the client device in response to selection of the selectable graphical user interface element, the tabbed interface including the custom object tab.

13. The method of claim 8, wherein the new custom object type is only available to users associated with a particular tenant of the plurality of tenants.

14. A computer system comprising a processor and a memory, wherein the memory comprises computer-executable instructions that, when executed by the processor, cause the computer system to:

provide a graphical user interface including a first graphical user interface element for receiving a custom application name, a second graphical user interface element for receiving a custom object name, and a selectable graphical user interface element;

automatically create first metadata defining structure for a new custom object type and second metadata defining structure for a new custom application in a multi-tenant database in response to selection of the selectable graphical user interface element, the first metadata including a first field equal to the custom object name and the second metadata including a second field equal to the custom application name, the second metadata maintaining an association between the first metadata and third metadata maintained in the multi-tenant database corresponding to a second object tab; and automatically generate a new custom application having the custom application name by displaying a tabbed interface including the second object tab and a custom object tab having the custom object name in response to selection of the selectable graphical user interface element.

15. The computer system of claim 14, wherein the computer-executable instructions cause the computer system to:
assign a default value to a third field of the first metadata.

16. The computer system of claim 15, wherein the computer-executable instructions cause the computer system to provide a third graphical user interface element for creating a new instance of the new custom object type in the multi-tenant database when the custom object tab is activated.

\* \* \* \* \*